United States Patent [19]

Marion

[11] 4,101,291

[45] Jul. 18, 1978

[54] OXYGEN GAS GENERATOR AND METHOD OF MANUFACTURING THE GAS GENERATOR

[75] Inventor: Frank A. Marion, Riverside, Calif.

[73] Assignee: Universal Propulsion Company, Inc., Mesa, Ariz.

[21] Appl. No.: 712,280

[22] Filed: Aug. 6, 1976

[51] Int. Cl.² ........................... C10L 5/02; C10L 5/00
[52] U.S. Cl. ......................................... 44/17; 44/7.5; 252/186; 423/579
[58] Field of Search ............... 44/3 R, 3 B, 7.5, 16 A, 44/16 B, 17, 1 F; 423/579; 252/186

[56] References Cited

U.S. PATENT DOCUMENTS

| | | | |
|---|---|---|---|
| 1,493,347 | 5/1924 | Kochmann | 44/3 R |
| 3,089,855 | 5/1963 | Bavard | 44/7.5 X |
| 3,385,681 | 5/1968 | Mennen | 44/17 |
| 3,485,599 | 12/1969 | Richardson | 44/17 |
| 3,702,305 | 11/1972 | Thompson | 423/579 X |

FOREIGN PATENT DOCUMENTS 880,868 10/1961 United Kingdom ................. 44/3 R

*Primary Examiner*—Carl F. Dees
*Attorney, Agent, or Firm*—Charles H. Schwartz

[57] ABSTRACT

A gas generator is capable of being stored in a stable form for long periods of time without deteriorating in quality. The gas generator provides a substantial amount of gases, and particularly oxygen, carbon monoxide or carbon dioxide without producing any harmful or hazardous chemicals. The gas generator includes in some embodiments a minimum of fuel so that a maximum amount of oxygen in the generator is capable of being liberated. The oxygen is liberated by the combustion of a fuel at localized positions in a refractory binder, which has the property of preventing the salt residue from becoming molten and the oxidizer from flowing and thereby preventing the combustion from becoming extinguished.

The gas generator includes a suitable clay as a binder, coke as the fuel and a chlorate such as sodium chlorate or potassium chlorate as the oxidizer. The binder is included in the generator in the range of approximately 7% to 15% by weight; the fuel is included in the generator to an amount of approximately 25% by weight, depending upon the use to be made of the generator; and the remainder constitutes the oxidizer.

19 Claims, 1 Drawing Figure

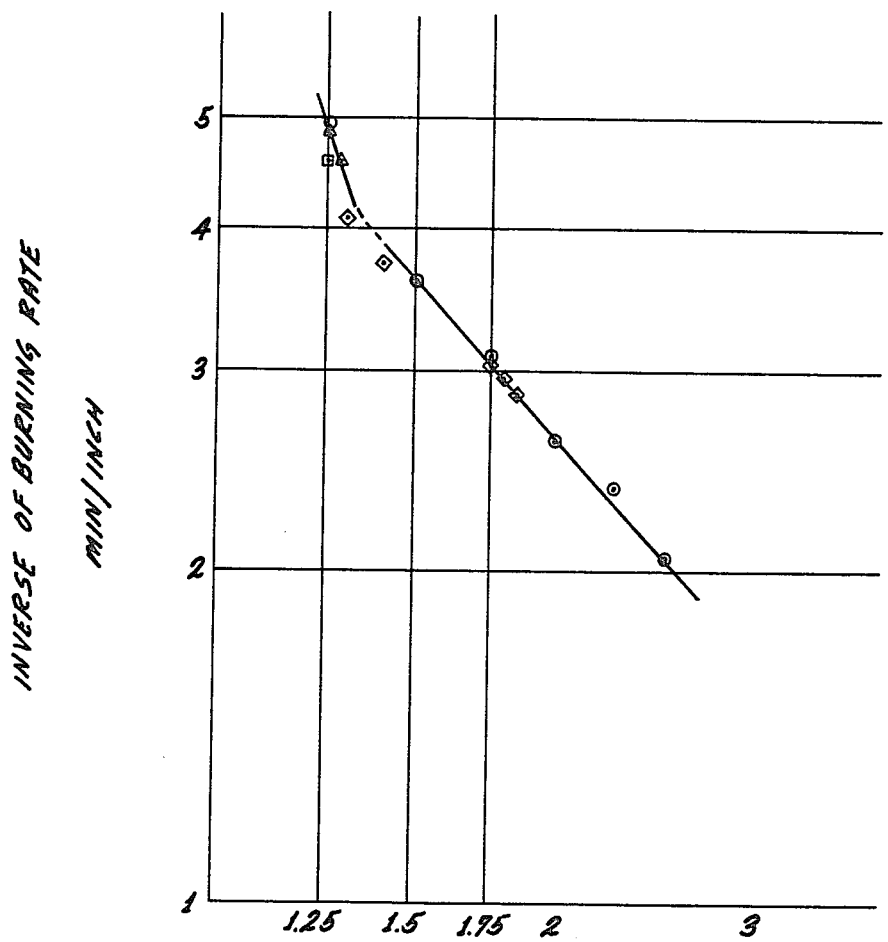

OXYGEN GAS GENERATOR AND METHOD OF MANUFACTURING THE GAS GENERATOR

This invention relates to a gas generator. More particularly, this invention relates to a gas generator disposed in a solid form with stable properties until use and with properties of generating a gas, and particularly oxygen, without also generating hazardous or harmful chemicals. The invention also particularly relates to an oxygen generator which is capable of generating a considerably greater amount of oxygen per unit of stored volume than any of the generators of the prior art.

It is desirable in a number of different applications to generate oxygen, carbon monoxide or carbon dioxide. For example, a supply of oxygen is often desirable on a controlled basis for life-saving purposes such as for resuscitating patients or for sustaining patients who have had heart attacks. Oxygen is also desired in industrial applications such as equipment for welding, brazing, smelting or heat treating different materials. Oxygen is also desired for instituting, generating or sustaining combustion of various materials including wood, coal, coke, petrochemicals or paper products. Gases such as carbon monoxide or carbon dioxide are further desired to inflate articles such as rafts or slides for aircrafts, life vests, balloons and underwater inflation devices.

Although different types of gas generators are available, generators in the form of solid candles have certain inherent advantages. They are fairly compact and light in weight and generate significant amounts of oxygen per unit of volume. They do not generate noxious or hazardous fumes while being stored and they do not present any problems of instability so as to be explosive while being stored. In view of these advantages, oxygen generators in the form of solid candles can be easily transported and stored until placed into use.

The oxygen generators now in use in solid form generally include a fiberglas as a binder, iron powder as a fuel and a chlorate such as sodium chlorate as an oxidizer. The fiberglas has certain disadvantages as a binder. It is somewhat hydrophyllic so that it tends to retain moisture during the formation of the generator and to attract moisture after the formation of the generator. It tends to have a relatively low green strength when moist and to retain the fuel in clumps in the generator rather than allowing the fuel to be dispersed evenly throughout the generator. When the fuel in the generator burns to produce heat and to provide for the liberation of oxygen by the generator, the fiberglas tends to melt and to flow, thereby preventing the oxygen from being liberated on a controlled basis at a uniform rate. Furthermore, when the fuel in the generator burns, the moisture in the generator vaporizes and thereby inhibits the combustion. As will be seen from the subsequent discussion, the moisture also tends to react with other materials in the generator to produce hazardous or harmful chemicals.

The oxygen generators now in use include iron powder as the fuel. This is disadvantageous for certain important reasons. As the oxygen generator ages, the iron powder rusts. Iron powder as a fuel is advantageous because it can combust to the ferrous or ferric forms to generate heat and thereby liberate the oxygen in the chlorate. However, when the iron powder rusts, it becomes converted to the ferric form ($Fe_2O_3$) and is no longer combustible. The rusting of the iron powder in the oxygen generators of the prior art has been accelerated by the inclusion of moisture in the generator, particularly since the iron powder and the moisture have been included in the presence of a strong oxidizer such as sodium chlorate. As a result, the oxygen generators in solid form have had only a limited shelf life.

A chemical has generally been included in the oxygen generators now in use to inhibit the generation of noxious fumes. This catalyst has been primarily barium peroxide ($BaO_2$). However, when the oxygen generator of the prior art has been formed, some water has been mixed with the other chemicals to facilitate the formation of the oxygen generator. The water has reacted with the barium peroxide to form barium hydroxide ($Ba(OH)_2$). The barium hydroxide in turn has reacted with additional molecules of water to form barium hydroxide octahydrate ($Ba(OH)_2 \cdot 8H_2O$).

The water in the barium hydroxide octahydrate can only be removed at a relatively high temperature in the order of 550° C. This temperature is considerably higher than the temperature (approximately 245° C.) at which the mixture of the fuel (iron powder) and the chlorate in the oxygen generator decomposes exothermically or, in other words, autoignites. As a result, if any attempt should be made to eliminate the water molecules from the barium hydroxide after the formation of the oxygen generator, the oxygen generator would be comsumed.

The barium peroxide has been included in the oxygen generators of the prior art to react with free chlorine liberated from the sodium chlorate during the combustion of the fuel in the generator. Actually, because of the entrapment of the water molecules in the barium hydroxide and the conversion of the barium peroxide to barium hydroxide octahydrate, the barium peroxide has not been able to react chemically with the free chlorine. What has actually happened has been the decomposition of the sodium chlorate to sodium chloride (NaCl) and oxygen and the melting of the sodium chloride (NaCl) at a temperature of approximately 248° C. and the vaporization of the sodium chloride at a temperature of approximately 1414° C. The vaporization of sodium chloride is produced at the points of combustion of the fuel and the oxygen liberated from the chlorate even though the average temperature in the reaction zone is in the order of 700° C. to 800° C. When the sodium chloride becomes vaporized, it reacts with water released from the barium hydroxide octahydrate as follows:

$$NaCl + H_2O \rightarrow HCl + NaOH. \qquad (1)$$

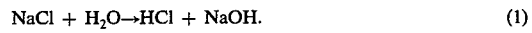

As is well known, hydrochloric acid (HCl) is noxious. Since the temperatures are quite high, the hydrochloric acid vaporizes so that it is breathed by the people in the vicinity of the oxygen generator. Furthermore, heat is absorbed in such a reaction so as to inhibit the continued liberation of oxygen from the generator. The heat absorbed is in the dehydration of the barium peroxide octahydrate to make water molecules available for reaction with the sodium chloride. Since this heat is absorbed at the combustion zone, it decreases the heat available to decompose the sodium chlorate.

When the water molecules are released from the barium hydroxide octahydrate at a temperature of approximately 550° C., the water molecules tend to produce a vapor at the surface of the oxygen generator. This tends to inhibit further combustion of the fuel (iron powder) and the oxygen liberated from the sodium chlorate. Furthermore, the high heat capacity and heat vaporization of the water reduce the net enthalpy resulting from the heat liberated by the decomposition of the sodium chlorate to sodium chloride and free oxygen and the combustion of the fuel with the free oxygen. This reduction in the net enthalpy may be so great as to cause the oxygen generator to become extinguished or even to prevent the fuel in the generator from becoming ignited.

Manganese powder has sometimes been used as the fuel in oxygen generators. In the presence of moisture such as water or a fine spray or as a vapor (steam) added during the mixing process, manganese exhibits dangerous properties. This may be seen from the following chemical reaction:

$$Mn + H_2O \rightarrow MnO + H_2. \tag{2}$$

The liberation of hydrogen in the presence of atmospheric oxygen sometimes produces an explosive gas mixture. The explosive reaction of the hydrogen and the oxygen is facilitated by the heat liberated from the exothermic reaction of manganese and water.

The production of the oxygen generators specified above has generally occurred in the presence of a significant amount of water. This significant amount of water has been as high as 5% of the weight of the oxygen generator. For the reasons discussed above, the water has been retained in the oxygen generator even though there has been a conscious desire, and even attempt, to remove such moisture from the generator.

This invention provides an oxygen generator which overcomes the above difficulties. The oxygen generator includes a binder which is not hydrophyllic and which has the properties of remaining in solid form even while the fuel in the generator is being combusted. The binder has the properties of retaining the fuel dispersed throughout the binder rather than being bunched as in the prior art. The binder provides good strength even while green. By "green" is meant the moist, undried or uncured state of the freshly pressed or consolidated candle ingredients. The binder can be mixed with the fuel and the oxidizer by the addition of a minimal amount of water so that a minimal amount of water is retained in the oxygen generator after the formation of the generator. Steps can be taken to remove this water, without combusting the fuel, after the generator has been formed.

The oxygen generator of this invention also includes a fuel which is not hazardous and which does not emit noxious fumes when combusted. The fuel is provided in the form of relatively large particles which are uniformly dispersed in the binder in isolated relationship to one another. In this way, combustion of the fuel occurs at isolated or localized positions with the production of concentrated heat and high temperatures at these isolated or localized positions. This prevents a continuous liquid interface of molten sodium chloride from being produced between the combustion zone and the decomposed candle. Molten sodium chloride is still produced in this invention at random positions but the molten sodium chloride has an opportunity to cool and solidify at these positions after the fuel has been consumed at these positions.

By providing for the production of the combustion of the fuel at the isolated or localized positions, the combustion is also sustained on a controlled basis such that the combustion can be interrupted at any time desired.

This can be accomplished by bending or breaking the candle along the surface of the combustion. Furthermore, the combustion occurs at a slower rate in certain embodiments of the generators of this invention than in the generators of the prior art so that a generator of minimal weight can be provided for a reaction intended to continue over a predetermined period of time.

In other embodiments of the generator of this invention, combustion can be produced at a faster rate that in the prior art. This can be an advantage in producing an increased rate of heat flux for such operations as brazing. The increased rate of oxygen flow in these embodiments is useful in cutting or burning the metal by combustion with the excess oxygen provided by the generator.

The amount of fuel used in the oxygen generator of this invention is less than the amount of fuel included in oxygen generators of the prior art. The combined embodiment of fuel, binder and catalyst used in the oxygen generator of this invention is also less than that in the prior art. In this way, the amount of oxidizer included in the generator of this invention is substantially increased.

In the drawings:

FIG. 1 is a curve showing the rate of combustion of the fuel in an oxygen generator in relation to the amount of fuel in the generator.

A suitable clay such as bentonite is preferably used as the binder in the oxygen generator of this invention. Bentonite constitutes a hydrous aluminum silicate found, for example, in Wyoming. It may be defined as a colloidal clay of the montmorillonite mineral group. It swells in water or with the addition of water and carries sodium as its predominant exchangeable ion. It may be classified nominally as $Na_2O\text{-}CaO\text{-}6Al_2O_3\text{-}36SiO_2\text{-}0.7Fe_2O_3$. A typical percentage by weight of the different materials in bentonite is as follows:

| Material | Percentage (%) |
|---|---|
| Silica ($SiO_2$) | 69.76 |
| Alumina ($Al_2O_3$) | 16.84 |
| Ferric Oxide ($Fe_2O_3$) | 3.51 |
| Lime (CaO) | 1.80 |
| Magnesia (MgO) | 0.97 |
| Soda ($Na_2O$) | 1.95 |
| Potash ($K_2O$) | 0.20 |

It will be appreciated, however, that different bentonite deposits will have different compositions from that specified above. Bentonite having a relatively high percentage of sodium may be used as the binder in oxygen candles. The igniters for charcoal briquettes may use either sodium bentonite or calcium bentonite or a mixture of various bentonites to provide desired properties of processing or cured strength.

A clay such as bentonite begins to soften at about 1037° C., and fusion occurs at 1337° C. to form a refractory matrix material. When the oxygen candle is ignited, the bentonite binder tends to lose slightly less than 6% of its weight through vaporization of chemically held water and other causes. Since the clay binder may represent 7% of the candle formula, the chemically held water may be less than 0.5% of the candle weight.

Bentonite has a good thermal conductivity so as to transfer heat between the different localized hot spots as the fuel in the generator is combusted. Actually, the bentonite has a better thermal conductivity than sodium chlorate, which is included as the oxidizer in the generator. In this way, the clay such as bentonite tends to sustain the combustion of the fuel after such combustion has been initiated.

Bentonite has other desirable properties of some importance. It provides a high green strength such that the oxygen generator of this invention is strong even before it is dried or cured. Furthermore, the high green strength of the bentonite causes it to position and retain the fuel and the oxidizer even while it is wet. This insures that the fuel will be thoroughly dispersed throughout the binder.

Since it is essentially a refractory material, bentonite does not melt or flow even when subjected to high temperatures such as occur when the fuel in the generator is combusted. A clay such as bentonite offers the further advantage of quiet and ready release of water at temperatures below the boiling point of water, with negligible retention of molecules of water. It is easily mixed uniformly with the fuel and the oxidizer to form a homogeneous mixture.

Preferably the clay such as bentonite is retained in the mixture in the range of 7% to 10% by weight when the generator is used as an oxygen candle or as an igniter for charcoal briquettes. However, the bentonite can be included in the range of 4% to 20% by weight, particularly when it is used for other purposes than as an oxygen candle or as an igniter for charcoal briquettes. As the percentage of bentonite in the generator is increased, the combustion of the fuel becomes correspondingly inhibited since the bentonite tends to isolate the different fuel particles.

Lignin may also be used as the binder. The lignin may be used alone or in combination with bentonite or a suitable material such as calcium carbonate or both the bentonite and the calcium carbonate. When lignin is used in combination with calcium carbonate, the sodium lignol sulfonate (lignin) combines with the calcium carbonate to form calcium sulfate and sodium carbonate. By way of illustration, the mixture may include as the binder a combination of approximately 5% to 10% by weight of bentonite, approximately 1% to 5% by weight of lignin and approximately 1% to 3% by weight of calcium carbonate.

The fuel preferably comprises finely granulated particles of coke or charcoal. The coke is commercially designated as fluid coke, which is solid carbonaceous residue. Such a carbonaceous residue is produced by fractional distillation of petroleum in a reducing atmosphere to remove the volatile fractions, leaving only the fixed carbon and the ash content after the water and the volatile matter are removed. This material constitutes essentially pure carbon with an ash content dependent upon the petroleum from which the coke is derived. Coke breeze may also be used instead of fluid coke. Coke breeze has a compositon similar to that of fluid coke.

Depending upon the use to be made of the oxygen generator, sea coal may also be used. For example, when the oxygen generator is to be used to ignite charcoal briquettes to obtain the combustion of the briquettes in an outdoor barbeque, sea coal is preferably used as the fuel because it contains volatile hydrocarbons in solid forms. These hydrocarbons are ignited relatively easily by the flame from a match or by striking the generator on a phosphorous strip. When the hydrocarbons are ignited, they fuel the generation of heat and oxygen for igniting the briquettes.

Although bentonite requires a temperature of 1337° C. for fusion, local temperatures greater than 1400° C. are produced at the localized positions of combustion of the fuel. This may be seen from the fact that a salt fog (or vapor) of sodium chloride is produced at the face of the oxygen generator. Sodium chloride vaporizes at a temperature in excess of 1411° C. When the oxygen generator is used as an oxygen candle, the salt fog is removed by filtering because the salt fog tends to make the flame yellow.

Generally, not all of the fuel is consumed in the combustion process. One reason is that the coke or charcoal or sea coal is diluted somewhat by the ash content of the fuel. Another reason is that the coke or charcoal or sea coal is encapsulated by the binder such as the bentonite. Since the combustion occurs on a localized basis, not all of the fuel is accessible to the combustion because of the encapsulation by the clay.

Preferably the particles of fuel should not be too small, such as in a finely divided powder. When a finely divided powder such as carbon black or lamp black is used, the entire combustion zone is liquefied to such a depth as to cause flow of the molten sodium chlorate. This flow tends to extinguish the combustion, particularly since the flow is often away from the area of combustion. The use of a finely dispersed powder as the fuel is particularly undesirable when the generator is to be used as a free standing candle.

Coke burns more slowly than sea coal. However, it tends to produce a hotter fire than sea coal, partly because it combusts to carbon dioxide. Another reason is that it produces no water as it burns. This is advantageous because water acts as a coolant or heat sink in the combustion zone. Therefore, coke tends to utilize oxygen more efficiently within the confines of the oxygen generator than sea coal. Since some uses of the oxygen generator are to provide an efficient liberation of oxygen, the use of coke as the fuel is preferable in such instances. For example, when the oxygen generator is used as an oxygen candle to produce as much oxygen as possible for a given weight and volume of the candle, the use of coke as the fuel is preferable. Under such circumstances, the coke preferably has a range by weight in the order of (1½%) to 4% in the candle. However, coke in a range of approximately 1% to 5% can be used. This means that the oxidizer in the candle has a weight as high as 92% in the candle. It further means that most of the oxygen in the oxidizer can be liberated without being consumed by combustion with the fuel.

The heat from the igniter should be controlled within certain limits when the generator is used as an oxygen candle. If the heat from the igniter is too great, the oxygen candle will melt below the combustion zone and flow away from the zone, thereby causing the combustion zone to become extinguished.

When the oxygen generator is used as an oxygen candle, it provides insulation except at the surface where it is being combusted. For example, the oxygen candle can be manually handled by grasping it at a position a fraction of an inch removed from the surface of combustion. Furthermore, the candle can be extinguished by placing it on its side and cutting or breaking the ash from the parent material. This causes the ash to fall away from the remainder of the material in the candle and the remainder of the material to be saved for a subsequent combustion.

As previously explained, the use of sea coal is desirable when the oxygen generator is used to ignite such difficult material as charcoal briquettes. The use of sea coal is desirable because it will ignite more readily, than will fluid coke or other fuels, from a match or other convenient source of heat and flame. This results in part from the inclusion of the volatile material in the sea coal, as explained above. The sea coal may be ASTM Classification II, Bituminous, Group 5, high volatile C.

The amount of fuel in oxygen generator for use in igniting charcoal briquettes is preferably higher than in other applications. For example, an amount of sea coal as high as 15% or 20% can be used. Preferably, the amount of fuel in an oxygen generator for igniting charcoal briquettes is in the order of 7%. When a fuel level of approximately 7% is used in igniting charcoal briquettes, an excess of oxygen is assured for hypergolic oxidation of the briquettes in the ignition process. As will be appreciated, if the heat from the ignition is not sufficient, the charcoal briquettes will not be ignited.

When the oxygen generator is used to ignite charcoal briquettes, the oxygen generator can be activated by striking it on the strip included on match books for igniting matches. The heat generated by the friction between the match strip and the oxygen generator is sufficient to ignite the fuel in the oxygen generator. This occurs through the following chemical reaction:

$$P + NaClO_3 \rightarrow P_2O_5 + NaCl \qquad (3)$$

As will be appreciated, the phosphorous in the above chemical reaction is obtained from the match strip. The heat generated by the above reaction causes oxygen to be released by the sodium chlorate. This oxygen in turn reacts with the fuel in the generator to produce combustion and generate additional heat. By generating excess oxygen, heat is liberated and the oxygen is freed to combust with the charcoal briquettes. In addition, relatively little salt fog is produced to inhibit combustion.

Sea coal having a weight as high as approximately 20% in the mixture has been used with a binder having a weight as high as approximately 20% to ignite charcoal briquettes. In such a mixture, the predominantly carbon fuel becomes combusted to carbon monoxide and hydrogen. These combustible gases then undergo secondary combustion with atmospheric oxygen to produce water and carbon dioxide. Such combustion causes temperatures in excess of 1800° C. to be produced. Although the charcoal or other combustible fuel is enveloped in a reducing atmosphere, the heat transfer is more than adequate to raise such combustibles above their auto ignition temperatures. This causes the combustibles to ignite and sustain combustion with atmospheric oxygen after the igniter is consumed. However, salt fog tends to be produced. The salt fog tends to inhibit the surface of the combustible fuel from direct contact with the atmospheric oxygen that it needs to support ignition and combustion. As a result, the use of a relatively high percentage of fuel in an igniter for charcoal briquettes is not as desirable as those igniters which provide a reduced amount of fuel and which generate oxygen.

In an igniter for charcoal briquettes, an increased amount of binder offers certain advantages. It improves the plasticity of the wet mixture for ease of molding the mixture into a desired shape such as a slender rod. As will be appreciated, a slender rod is desirable because it distributes the heat over an expanded area or volume and ignites an increased mass of the charcoal briquettes with a particular weight of the igniter material. Furthermore, by increasing the weight of the binder in the igniter material, the freshly molded rods are provided with an enhanced green strength and the strength of the rods is enhanced after the rods have been cured. The cost of the rods is reduced by increasing the percentage of weight of binder in the rods.

The oxidizer described above has certain advantages in addition to those set forth above. For example, a percentage by weight as high as 92% for the oxidizer is considerably greater than that provided for the oxidizer in the generators of the prior art. Furthermore, since the amount of fuel is relatively low in the generator of this invention and since the combustion of the fuel is quite efficient, particularly when coke (as distinguished from sea coal) is used, a considerably larger percentage of oxygen is available in the generator of this invention for subsequent use than in the generators of the prior art.

The technical grade of sodium chlorate used in the oxygen generator preferably has a minimum purity of 99.5%. The sodium chlorate preferably has a maximum content of 0.12% of sodium chloride by weight and a maximum content of 0.20% of water by weight. It is preferably produced by electrolysis of an aqueous solution of technically pure sodium chloride.

Preferably a generator to be used as an oxygen candle has a cylindrical shape similar to that of an ordinary candle and a generator to be used as an igniter for charcoal briquettes has the shape of a cylindrical rod, which may be approximately 4 inches long and may have a diameter of approximately one half inch. All portions of the candle or rod form a uniform mixture. Although the igniter for the charcoal briquettes is preferably in the form of a cylindrical rod, other shapes such as discs and spheres may also be used. The generator may also be in other shapes than cylindrical when it is used as an oxygen candle.

When fluid coke (or coke breeze) is used as the fuel in candles designed for closed pressure vessel combustion, burning times ranging from 5 minutes per inch to 2 minutes per inch are generally produced as the fuel content is varied from 1.25% to 2.5%. FIG. 1 illustrates the increase in the proportional ratio, substantially linear, of fuel content to burning time. This substantially proportional relationship has been maintained in tests with fuel to 15% by weight in the candles.

The tests in FIG. 1 were made at atmospheric pressure on a candle having an outer diameter of approximately 1⅛ inches. It has been found that the diameter of the candle influences the ability of the candle to sustain combustion. As the diameter of the candle is increased, the percentage of fuel required to sustain combustion becomes correspondingly decreased. This results from reduced heat loss as the diameter is increased, the reduced heat loss resulting from the increase in cross sectional area relative to the circumference of the candle.

Candles approximately 4 inches in length and approximately 7/8 inch in diameter have also been produced with a burning time greater than 15 minutes for each candle. Six of these candles and eight igniters have a net weight of less than 1 pound and provide an oxygen supply for approximately 1½ hours for a torch tip of approximately 0.052 inch in diameter.

By varying the fuel ratio so as to progressively increase the oxygen output per unit of time with a corresponding reduction in burning time, one pound of oxygen candles will supply the oxygen required for various sizes of torch tips as follows:

| Tip Diameter in Inches | Burn Time in Minutes/Pound |
| --- | --- |
| 0.052 | 90+ |
| 0.065 | 66+ |
| 0.070 | 60+ |
| 0.080 | 50+ |
| 0.085 | 45+ |
| 0.100 | 30+ |

It has also been found that six candles, each having an axial length of approximately 2⅝ inches and a diameter of 1⅛ inches, and seven igniters weigh less than 1 pound. It has been further found that the candles, when ignited by the igniter, will supply oxygen for at least 1 hour. According to the regulations of the United States Government, if oxidizing material can be packed in a package of less than 1 pound and if multiple packages can be packed in a container with the net weight of oxygen-generating material not exceeding 25 pounds, the container is exempt from labelling as hazardous. Because of this, the container is exempt from a premium type of shipping and can illustratively be made from styrene. In contrast, the prior art has required 1½ pounds to 2 pounds of material to obtain a supply of oxygen for at least 1 hour. As a result, the prior art has had to ship its material on a premium basis in metal containers with stringent labelling requirements and with no assurance even then that the material will operate properly when placed into use by the recipient.

One practical limit of fuel would be the stoichiometric properties for converting all carbon to carbon dioxide. This may be of interest in some applications as a hot gas generator. A formula for producing such conversion is as follows:

$$6C + 4NaClO_3 \rightarrow 4NaCl + 6CO_2 \qquad (4)$$

When the binder constitutes approximately 10% of the generator and when allowance is made for ash residue in the fuel, fuel having a weight of approximately 15% in the generator is needed to achieve this stoichiometry with approximately 75% by weight of sodium chlorate.

The upper practical limit of fuel would be the stoichiometric proportion to convert all of the oxygen in the generator to carbon monoxide. This may be seen from the following chemical reaction:

$$6C + 2NaClO_3 \rightarrow 2NaCl + 6CO \qquad (5)$$

Again, allowing for about 10% by weight of binder and for about 10% by weight of ash content in the fuel, the fuel would have a weight of about 25% and the sodium chlorate would have a weight of about 65%. This stoichiometry would provide a maximum number of molecules of gas from the generator relative to the weight of the reactants in the generator.

One application for a generator such as described in the previous paragraph would be for emergency gas generation, such as inflating a life raft, a life vest, a tire or a slide in an airplane. Another application is for use in a welding torch where a combustible gas such as carbon monoxide is mixed with oxygen to produce a very hot flame for welding and brazing. As will be appreciated, the carbon monoxide can be produced by a generator such as specified in the previous paragraph and can be mixed with oxygen obtained from an oxygen candle. This eliminates the need for bottled fuel gases such as propane or methyl acetylene propadiene (MAPP).

The gas generators are formed by volumetrically proportioning the different ingredients as a first step. The proportional ingredients may be transferred by a conveyer belt and then thoroughly mixed with ambient temperatures to form a homogeneous blend. Water may then be introduced to the homogeneous mixture in the form of a vapor, as steam or as a finely dispersed spray. The amount of water introduced to the mixture may be as little as 1.5% by weight. From a practical standpoint, as small an amount of water as possible is introduced to the mixture. The material is then pressed into tablet or rod form or into the form of an oxygen candle.

The material is then dried by directing hot air or forced air past the tablets, rods or candles. Chemical desiccants such as calcium chloride and mechanical desiccants such as molecular sieves may also be employed to remove water vapor from the recirculated hot air in the drying process and to assure complete drying of the product. The drying of the product is facilitated because the characteristics of the binder offer the further advantage of quiet and ready release of the process water at temperatures below the boiling point of water, with negligible retention of molecular water.

By limiting the amount of process water to a weight as low as 1.5%, the material constitutes a damp powder which will flow. This is in contrast to the prior art which adds water in an amount of 5% during the processing operations and accordingly produce a wet powder which flows poorly. Furthermore, the addition of water in an amount of only 1.5% to the material of this invention enhances the green strength of the material and reduces breakage of the undried material. It also minimizes the energy required to subsequently dry the material.

Although this application has been disclosed and illustrated with reference to particular applications, the principals involved are susceptible to numerous other applications which will be apparent to persons skilled in the art.

I claim:
1. The combination in a generator for generating gases at a high temperature,
   a refractory material providing a non-hydrophyllic binder having a substantial green strength and having a percentage by weight no greater than approximately 15% by weight of the mixture,
   an oxidizer having properties of decomposing to liberate oxygen and having a percentage at least 60% by weight of the mixture, and
   a fuel having properties of combusting with the oxygen liberated by the oxidizer and constituting large particles for dispersion throughout the refractory material to provide the combustion at localized positions in the refractory material and having a percentage by weight no greater than approximately 20% by weight in the mixture,
   the refractory material having properties of softening and fusing at temperatures below the temperatures of combustion at the localized positions.
2. The combination set forth in claim 1, wherein the fuel has properties of providing substantially only carbon for combustion with the oxygen liberated by the decomposition of the oxidizer.
3. The combination set forth in claim 1 wherein the refractory material constitutes a clay and the fuel constitutes a coke.
4. The combination set forth in claim 1 wherein the binder constitutes 7% to 20% by weight and the fuel constitutes up to 25% by weight and the remainder constitutes the oxidizer.

5. The combination set forth in claim 4 wherein the fuel constitutes sea coal.

6. The combination set forth in claim 3 wherein
the refractory material constitutes bentonite having a weight in the order of 7% to 15% and the fuel has a weight in the order of 1% to 5% and the rest of the material is the oxidizer and the generator generates oxygen.

7. The combination set forth in claim 6 wherein the oxidizer is a chlorate.

8. The combination set forth in claim 7 wherein the oxidizer is sodium chloride and the fuel is fluid coke or coke breeze.

9. The combination set forth in claim 3 wherein the refractory material constitutes bentonite having a weight in the order of 7% to 20% and the fuel has a weight up to (20%) and the rest of the material is a chlorate.

10. In combination in a generator for generating gases at a relatively high temperature,
a clay having a good green strength and having non-hydrophyllic properties and having a percentage by weight no greater than approximately 20% in the mixture,
coke particles serving as a fuel and having properties of being retained by the clay in dispersed form at individual positions in the clay and having a percentage by weight no greater than approximately 25% in the mixture, and
an oxidizer having properties of decomposing to provide oxygen for combustion of the oxygen with the coke at the localized positions and having a percentage by weight of at least 60% in the mixture,
the clay having a melting temperature above the temperature at which the oxidizer decomposes.

11. The combination set forth in claim 10 wherein
the clay constitutes less than approximately 15% by weight,
the coke constitutes less than 25% by weight,
the remainder is the oxidizer and constitutes a chlorate, and
the generator provides gases for purposes of inflation.

12. The combination set forth in claim 10 wherein the clay constitutes bentonite and the oxidizer constitutes a chlorate.

13. The combination set forth in claim 11 wherein
the oxidizer is sodium chlorate and the clay has a range in the order of 7% to 15% by weight.

14. The combination set forth in claim 13 wherein the clay is bentonite.

15. The combination set forth in claim 10 wherein
the clay constitutes between approximately 7% and 20% by weight,
the coke constitutes to approximately 20% by weight,
the remainder is a chlorate, and
the generator is a combustion igniter.

16. The combination set forth in claim 15 wherein the coke is sea coal and the chlorate is sodium chlorate.

17. The combination set forth in claim 10 wherein
the clay constitutes between approximately 7% and 15% by weight,
the coke constitutes between 1% and 5% by weight,
the remainder is a chlorate, and
the generator generates oxygen.

18. The combination set forth in claim 16 wherein the binder is bentonite and the chlorate is sodium chlorate.

19. The combination set forth in claim 18 wherein the fuel is fluid coke or coke breeze.

* * * * *